(12) United States Patent
Lam et al.

(10) Patent No.: US 7,725,014 B2
(45) Date of Patent: May 25, 2010

(54) ACTUATOR FOR LINEAR MOTION AND TILTING MOTION

(75) Inventors: Sio Kuan Lam, De To Pou Gdn-Tsu Pou Kok (MO); Wing Ming Fan, Sheung Shui (HK); Tiegang Liu, JiangNan Zhen (CN); Kwok Sing Cheng, Tuen Mun (HK); Ho Shan Ng, Kowloon (HK)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 268 days.

(21) Appl. No.: 11/896,032

(22) Filed: Aug. 29, 2007

(65) Prior Publication Data

US 2009/0059373 A1 Mar. 5, 2009

(51) Int. Cl.
*G03B 17/00* (2006.01)
(52) U.S. Cl. .................................... 396/55; 348/208.11
(58) Field of Classification Search ................. 396/55; 359/824; 348/208.11, 208.12
See application file for complete search history.

(56) References Cited

U.S. PATENT DOCUMENTS

| | | | | | |
|---|---|---|---|---|---|
| 4,643,522 | A | * | 2/1987 | Takashima | 359/824 |
| 4,905,031 | A | * | 2/1990 | Mody | 396/133 |
| 5,237,363 | A | * | 8/1993 | Okada et al. | 396/55 |
| 5,640,280 | A | * | 6/1997 | Lee | 359/824 |
| 5,745,800 | A | * | 4/1998 | Kanbara et al. | 396/55 |
| 2003/0112722 | A1 | * | 6/2003 | Matsuura | 369/44.32 |
| 2004/0184166 | A1 | * | 9/2004 | Takizawa et al. | 359/822 |
| 2005/0134574 | A1 | * | 6/2005 | Hill | 345/173 |
| 2006/0028320 | A1 | * | 2/2006 | Osaka | 340/384.1 |
| 2006/0033818 | A1 | * | 2/2006 | Wada et al. | 348/208.11 |
| 2006/0214520 | A1 | * | 9/2006 | Tseng | 310/14 |
| 2006/0257131 | A1 | * | 11/2006 | Yoon et al. | 396/133 |

OTHER PUBLICATIONS

U.S. Appl. No. 11/173,644, filed Feb. 9, 2006, Tomohiko Osaka.
U.S. Appl. No. 11/117,535, filed Sep. 28, 2006, Yu-Kuang Tseng.
U.S. Appl. No. 11/399,866, filed Nov. 16, 2006, Young-Kwon Yoon.

* cited by examiner

*Primary Examiner*—Melissa J Koval
*Assistant Examiner*—Leon W Rhodes
(74) *Attorney, Agent, or Firm*—Pearl Cohen Zedek Latzer, LLP

(57) ABSTRACT

There is provided an actuator used in an optical system comprising a housing, a carrier disposed at least partly inside the housing, and a plurality of linear motion transducers coupled to the carrier and substantially evenly spaced around the carrier within the housing. Each linear motion transducer is able to produce linear motion when energized displacing the carrier relative to the housing to produce linear motion, tilting motion, or both of the carrier.

7 Claims, 4 Drawing Sheets

ACTUATOR FOR LINEAR MOTION AND TILTING MOTION

FIELD OF THE INVENTION

The present invention relates generally to an actuator for optical systems and in particular to a lens actuator for a camera.

BACKGROUND

A lens actuator is used to optimize an image captured by an image capturing device of a camera by controlling the position and/or movement of a lens. For example, an auto-focusing technique can be used to bring into focus in an image the subject that the user desires to capture based on the distance between the camera and the subject. This can be realized by the displacement of the lens along the optical (lens) axis, or a z-axis, to control the distance between the lens and the image capturing mechanism. Another technique is vibration compensation control, which compensates for motion of the camera body, for example, due to the shaking of the camera. This technique typically requires the lens, or one or more of the multiple lenses in a lens module, to be moved relative to the image capturing device to cancel the motion of the camera.

U.S. Patent Application Publication No. 2006/0028320 published in the name of Osaka on 9 Feb. 2006 describes an example of an autofocus actuator. A lens actuator has a lens holder with a coil wound around the lens holder When an electric current is supplied to the coil, the magnetic field induced by the electric current through the coil interacts with that of a permanent magnet surrounding the lens holder, causing the lens holder to be displaced along the optical axis. This autofocus actuator using a coil and the magnet realises a one-dimensional movement of the lens holder to implement an autofocus function.

For the prior art, only autofocus function can be achieved. A need exists for a mechanism adapted to provide both autofocus and vibration compensation functions.

SUMMARY

According to a first aspect of the present disclosure, there is provided an actuator used in an optical system. The actuator comprises a housing, a carrier disposed at least partly inside the housing, a plurality of linear motion transducers coupled to the carrier and substantially evenly spaced around the carrier within the housing. Each linear motion transducer is able to produce linear motion when energized displacing the carrier relative to the housing to produce linear motion, tilting motion, or both of the carrier.

According to a second aspect of the present disclosure, there is provided an optical system comprising the above actuator and a lens disposed within the carrier of the actuator.

According to a third aspect of the present disclosure, there is provided a camera comprising the above actuator, a lens disposed within the carrier of the actuator, an image capturing mechanism for capturing an image transmitted by the lens, a spacer disposed between the actuator and the image capturing mechanism, and a controller for the actuator to drive the linear motion transducers.

Through this arrangement, an actuator enabling both linear motion (e.g. for autofocus control) and tilting motion (e.g. for vibration control) utilizing a same structure is realised.

Other aspects of the invention are also disclosed.

BRIEF DESCRIPTION OF THE DRAWINGS

Embodiments of the invention are described hereinafter with reference to the drawings, in which.

DETAILED DESCRIPTION

Figure 1:
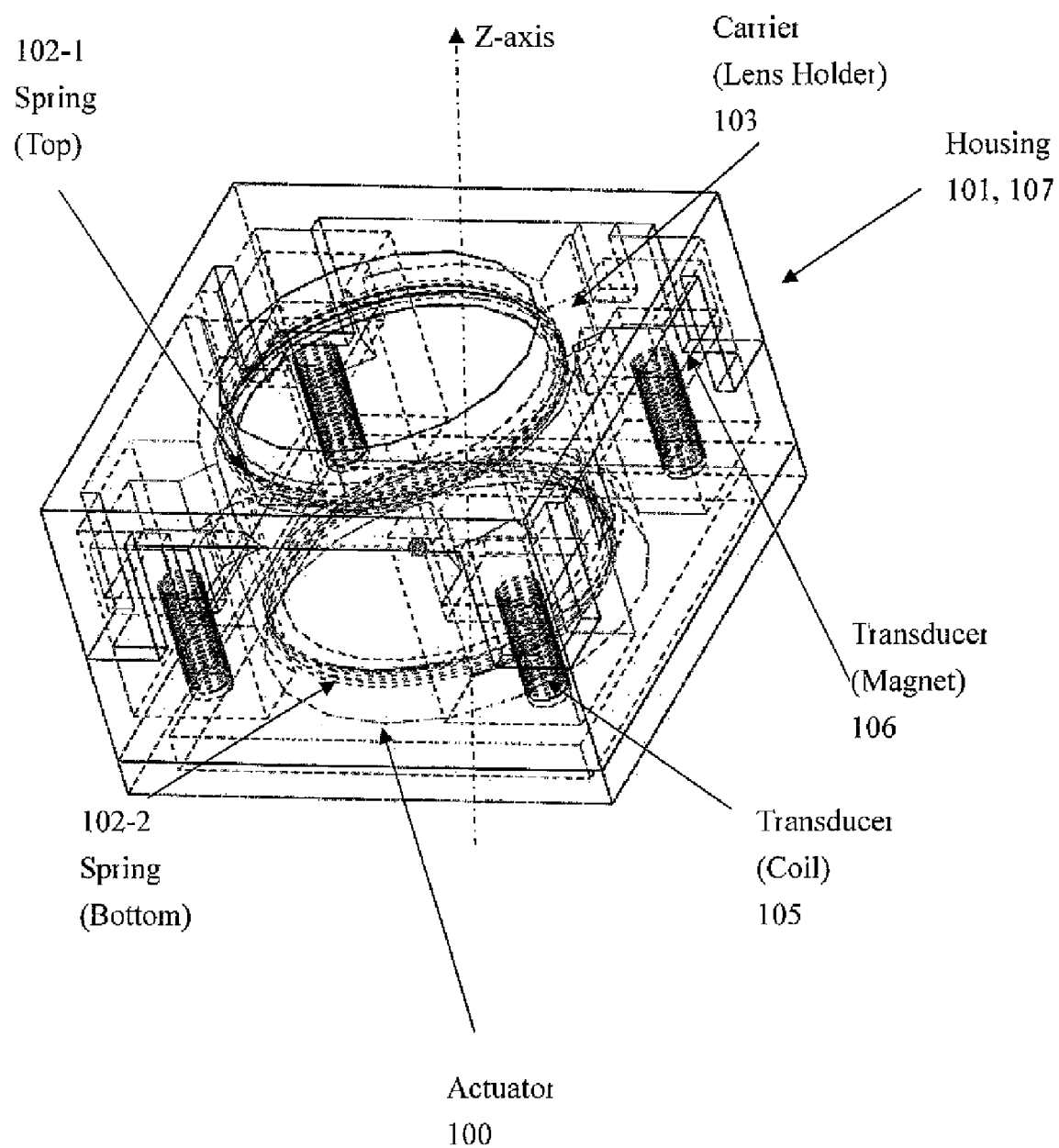
FIG. 1 shows a partially transparent perspective view of an actuator according to an embodiment of the invention.

FIG. 1 shows an actuator 100 used in an optical system in accordance with an embodiment of the invention: A carrier 103 is disposed at least partly inside the housing 101, 107 of the actuator 100. The movement of the carrier 103 is defined relative to the housing 101, 107. The housing can be formed as a single unitary component, or may comprise more than one component. Linear motion transducers 105, 106 are coupled to and placed around the carrier 103 in parallel with the carrier's longitudinal axis. Preferably, the transducers 105 106 are substantially evenly spaced around the carrier 103. When energized, the linear motion transducers 105, 106 can displace the carrier 103 to produce linear motion, tilting motion, or a combination of the two of the carrier 103

This actuator 100 can effect both linear motion and tilting motion of the carrier 103 depending on the control of the linear motion transducers 105, 106. The actuator 100 preferably comprises at least three linear motion transducers 105, 106.

The actuator 100 is preferably a lens actuator for a camera. In such an application, the carrier 103 is a lens holder that can hold a lens inside the lens holder in alignment with an aperture of the housing 101, 107 and an image capturing mechanism of the camera (e.g. a CCD array or film). The arrow z indicates the optical axis of the lens actuator and the camera (not shown). The linear motion of the carrier (lens holder) 103 enables auto-focusing, and the tilting motion of the carrier (lens holder) 103 enables vibration compensation.

The linear motion transducers 105, 106 preferably comprise one or more voice coils 105 in the housing 101, 107 and magnetic element 106 each disposed relative to the voice coils 105, so that the magnetic element 106 is perpendicularly oriented relative to the longitudinal axis of the respective voice coil 105. Each magnetic element 106 may have corresponding voice coils 105. When energized with an electric current, the magnetic element 106 is displaced relative to the voice coils 105 to cause the linear motion. The magnetic element 106 is positioned so that one end of each magnetic element 106 is coupled to the carrier 103 and the other end is adjacent to the voice coils 105.

The linear motion transducers 105, 106 can be selectively energized. When the transducers 105, 106 are energized selectively, the resulting linear motion of each linear motion transducer 105, 106 is independent of the other transducers. This linear motion can be employed to effect vibration compensation control by tilting the carrier 103 relative to its axis.

The linear motion transducers 105, 106 can also be energized to cause substantially equal linear motions of the transducers 105, 106. When a lens is disposed within the carrier, this can be employed to displace the carrier along the lens axis thereby performing auto-focusing of the lens Each linear motion transducer 105, 106 may comprise a piezoelectric device which alters in length along the longitudinal axis of the carrier 103 when the piezoelectric device is energized with electrical power.

Each linear motion transducer 105, 106 may comprise an electro-active polymer device which alters in length along the longitudinal axis of the carrier 103 when the electro-active polymer device is energized with an electric voltage.

Each linear motion transducer 105, 106 may comprise an ultra sonic motor.

The actuator 100 preferably further comprises a spring 102 disposed between the carrier 103 and an internal surface of the housing 101, 107 to control the movement of the carrier against the housing 101, 107. For example, the spring 102 can be a coil spring with a diameter larger than the inner diameter of the carrier 103, and aligned with the axis of the carrier 103. Alternatively, the spring 102 can be a set of leaf springs arranged around the perimeter of the carrier. The actuator 100 may have a pair of springs 102-1, 102-2, provided on opposite ends (top and bottom) of the carrier 103, for improved control of the movement of the carrier 103.

The actuator 100 can be used for an optical system (not shown) with a lens held within the carrier 103.

The actuator 100 can also be used in a camera (not shown) with a lens held within the carrier 103. The camera comprises an image capturing mechanism for capturing an image transmitted by the lens, a spacer between the actuator and the image capturing mechanism, and a controller to drive the linear motion transducers 105, 106 of the actuator 100. The camera can take a variety of forms of optical image capturing mechanisms, such as a still camera and a video camera.

Figure 2:
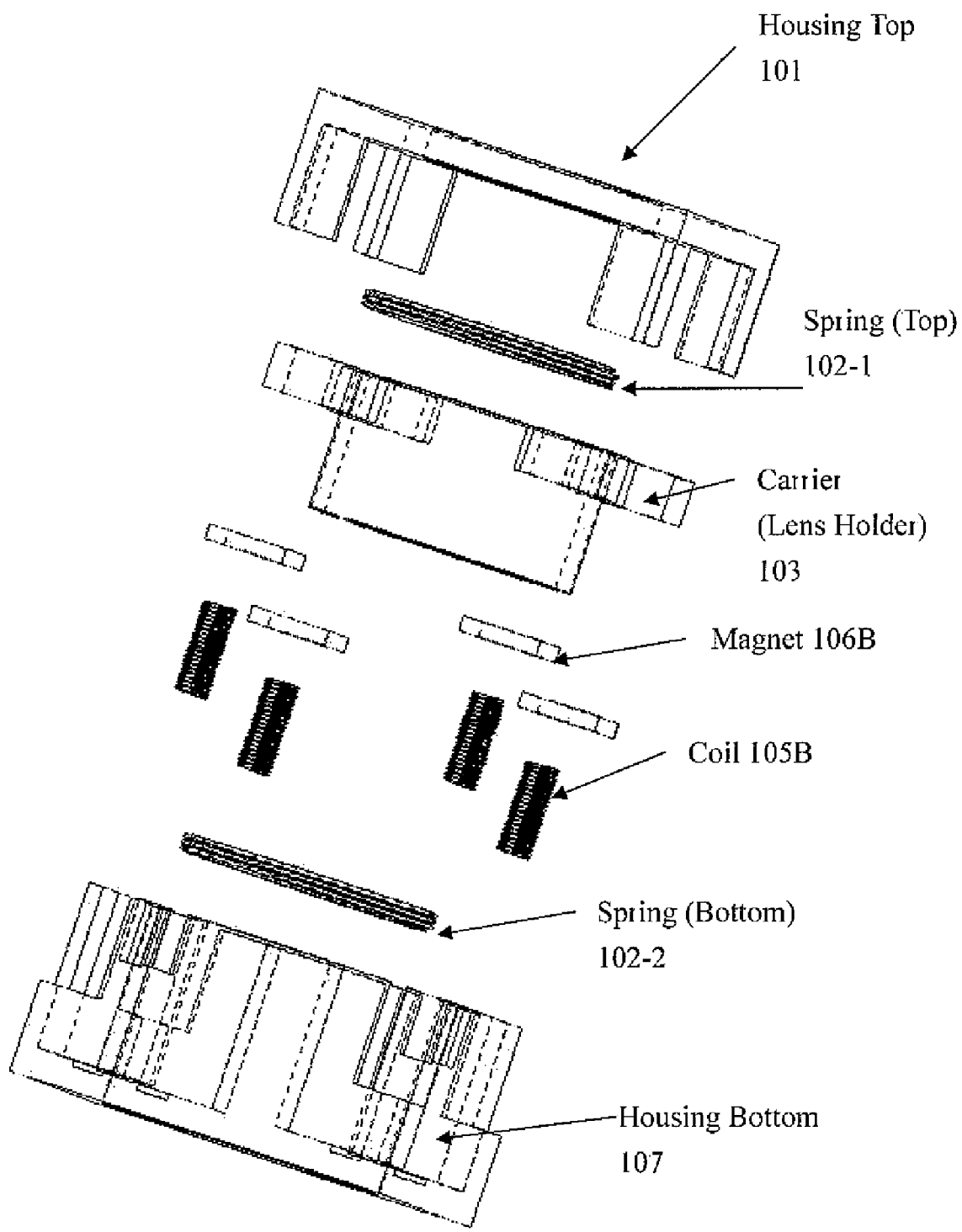
FIG. 2 shows an exploded perspective view of a lens actuator according to an embodiment of the present invention.

The structure of the actuator 100 is described in more detail using a lens actuator as examples shown in FIG. 2

FIG. 2 is an exploded perspective view of the lens actuator 100 in accordance with an embodiment of the present invention. The lens holder 103 is disposed inside the housing 101, 107. FIG. 2 shows the housing 101, 107 comprising a top portion 101 and a bottom portion 107, which fit together to form the casing for the lens holder 103 in this embodiment. However, the housing 101, 107 can be formed in other manners such as in the form of a single unitary component, or in a different manner of fitting together two or more components. In the following description, for the ease of explanation, the end of the housing through which the lens is pointed towards the subject of the image capturing is designated the direction "top" and the end through which the image falls onto the image capturing mechanism via the lens is designated the direction "bottom".

FIG. 2 shows the top end and the bottom end of the housing to have apertures through which the light passes to reach the image capturing mechanism (not shown). The lens actuator 100 is typically disposed so that the top end faces the light source (the subject of image capturing) and the bottom end faces the image capturing mechanism. The image capturing mechanism may be an electronic image capturing device in the case of a digital camera (e.g. a CCD array), or film in an analogue camera.

In FIG. 2, the linear motion transducer 105, 106 comprises a magnetic element 106 and a voice coil 105. The voice coil 105 is disposed below the magnetic element 106 inside the housing 101, 107 so that the planar surface of the magnetic element 106 is perpendicular to the longitudinal axis of the respective coil 105. The magnetic element 106 may comprise magnetic bodies each of which is disposed corresponding to one or more of the coils 105, as shown in FIG. 2. Alternatively, the magnetic element 106 may also be one or more continuous magnetic bodies each corresponding to two or more of the coils 105. The magnetic element 106 is positioned substantially above the coils 105 so that the magnetic field induced by the electric current flowing through each of the coils 105 interacts with the magnetic field of the magnetic element 106. The magnetic element 106 are positioned substantially perpendicular to the face of the coils 105 for maximum translation of motion of the magnetic element 106 to the lens holder 103.

The interaction between the magnetic field of the magnetic element 106 and the magnetic field induced by the electric current flowing through the coil 105 exerts a vertical force to repel each other and the magnetic element 106 is displaced vertically as a result. The vertical movement of a magnet element 106 is translated to a vertical movement of a portion of the lens holder 103 to which the magnetic element 106 is coupled. The bottom end of the magnetic element 106 faces the coil 105 and the top end of the magnetic element 106 faces the portion of the lens holder 103 designed to receive the force exerted by the magnetic element 106.

The lens holder 103 has a substantially cylindrical shape and is adapted to hold a lens in place inside the cylinder. A lens can be disposed inside the lens holder 103 of the lens actuator 100. The lens holder 103 has projected portions (arms) protruding outwardly from the cylindrical body, preferably at the top end of the body. Each projected portion is designed to receive the force exerted by the magnet movement and to translate the movement of the magnetic element 106 to the corresponding section of the lens holder 103.

Coils 105 are made of an electrically conductive material. Elements other than the coils 105 and the magnetic element 106, such as the housing 101, the lens holder 103, are made of non-magnetic materials such as plastics, so as not to interfere with the magnetic fields of the coils 105 and the magnetic element 106.

A spring 102, or a pair of springs 102-1 and 102-2 is preferably placed at one end or the opposite ends of the lens holder 103, between the lens holder 103 and the inside of the housing 101, 107 for better control of the movement of the lens holder 103. The springs 102 provides a restoring force to the lens holder 103 in a direction opposite to the displacement of the coils 105 when energized. The springs 102 also buffer the movement of the lens holder 103 against the housing. Each of the springs 102 can be a coil spring such as shown in FIG. 2, or a set of leaf springs. The spring(s) 102 can also be of other forms to ensure smooth and accurate movement of the lens holder 103 relative to the housing 101, 107. The inner diameter(s) of the spring(s) 102 is preferably substantially the same as or greater than the inner diameter of the lens holder 103 so that the spring(s) 102 does not interfere with the optical function of the lens. The spring(s) or the set(s) of springs 102 are desirably placed symmetrically around the lens holder perimeter, in alignment with the apertures for accurate control of the movement of the lens holder 103.

In FIG. 2, the voice coil 105 is fixedly coupled to the bottom section of the housing, and is stationary relative to the housing. This ensures that the force between the magnetic fields of the magnetic element 106 and the energized coils 105 efficiently translates to the movement of the magnetic element 106 which are the movable components.

Whilst FIG. 2 shows the magnetic elements 106 placed around the circumference of the lens holder 103 as an example of linear motion transducers, other forms of linear motion transducers can also be used. Examples of other forms of linear motion transducers include devices that change in shape especially in longitudinal direction along the optical axis (lens axis) in response to an input of some form of energy. A device that has a component that is displaced in response to energy can also be used. The linear motion transducers for the actuator 100 are desirably in a shape and a size that allows them to be placed around a lens holder 103.

For example, a piezoelectric device comprising a piezoelectric material that changes in shape upon a change in the electric power applied to the piezoelectric material can be used. An electro-active polymer material that changes in shape in accordance with an applied electric voltage can also be used. In these arrangements, one end of the transducer is fixedly coupled to the housing 101, 107, and the other end that is displaced as a result of the change of shape is coupled to the arms of the lens holder 103 to cause the displacement of the lens holder 103. An ultrasonic motor is an example of the linear motion transducer 105, 106 where a part of the device is displaced to cause the displacement of the coupled lens holder 103.

When all the linear motion transducers are energized with substantially the same amount of energy (e.g. electric current in the case of a coil-magnet combination of FIG. 2), this results in substantially the same amount of change of shape or displacement of the linear motion transducers 105, 106. This causes all the portions of the lens holder 103 corresponding to the transducers to be displaced by the same amount, and thus an overall linear motion of the lens holder 103 is effected. This method of control can be used for autofocus control.

Figure 3:
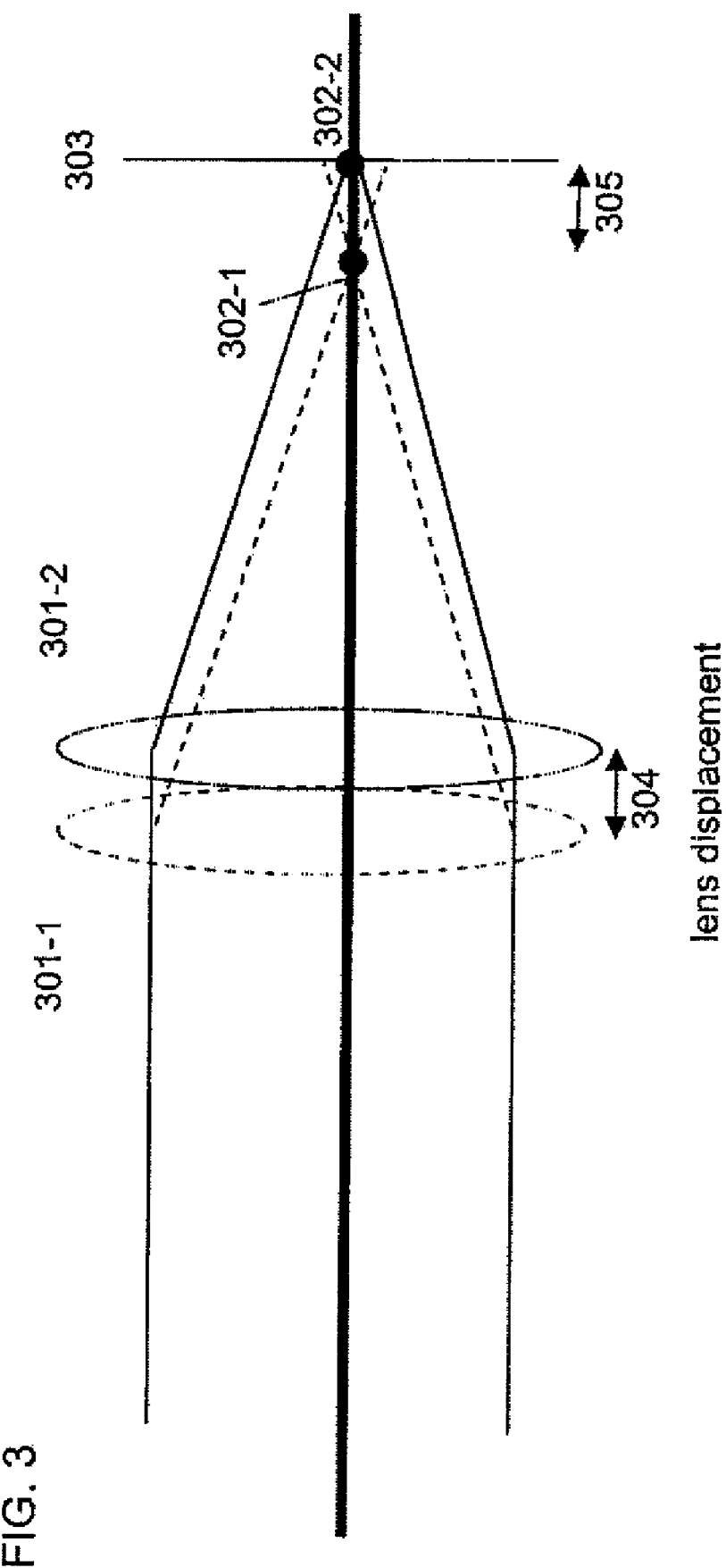
FIG. 3 is a schematic diagram illustrating the operation of the lens actuator for autofocus control.

FIG. 3 is a schematic diagram illustrating the operation of the lens for autofocus control. If a displacement 304 is desired to move the focal point by the distance 305 from the focal point 302-1 to 302-2, the lens is moved in an overall linear motion from position 301-1 to position 301-2 by causing a displacement or change in shape corresponding to the displacement 304 to all of the transducers 105, 106. Then the image comes into focus on the image capturing mechanism 303.

If the linear motion transducers 105, 106 are each subjected to different amounts of energy, this results in different amounts of displacement or change in shape of the transducers. This causes the lens holder 103 to be tilted according to the difference in displacements or changes in shape of the linear motion transducers. For this operation, only one or some of the transducers 105, 106 can be energized. If the tilting of the lens holder 103 is performed dynamically based on the movement of the camera or the lens module which may be detected by a motion detector of the camera or the lens module (not shown), the tilting of the lens holder 103 by the lens actuator 100 can be used for dynamic vibration compensation control.

Figure 4:
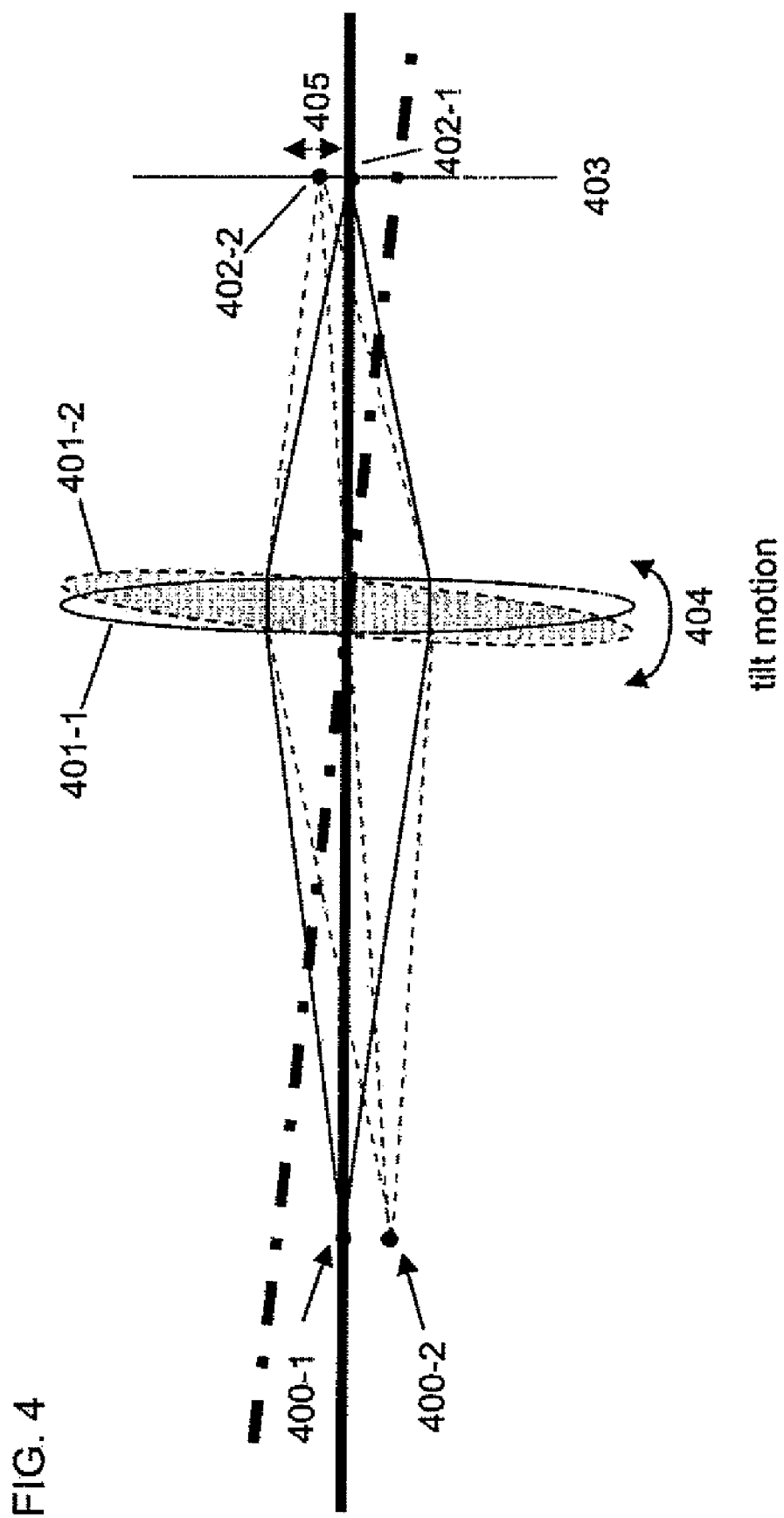
FIG. 4 is a schematic diagram illustrating the operation of the lens actuator for vibration compensation function through tilting of a lens.

FIG. 4 is a schematic diagram illustrating the operation of the lens for vibration compensation control. The points 400-1 and 402-1 and the continuous line connecting these points indicate the original position 401-1 of an object in relation to the lens 401, the original focal point of the image of the object at point 400-1 on the image capturing mechanism 403 and the optical path in between, respectively. When the body of the lens 401 is tilted and the position of the object relative to the lens shifts to point 400-2, the image of the object shifts undesirably to point 402-2 on the image capturing mechanism 403. The tilting motion 404 of the lens from position 401-1 to position 401-2 can cause the image of the object at relative position 400-2 to be shifted back to the position 402-1, in compensation of the undesirable shift 405. This tilting motion 404 can be realised by different amounts of displacement or change in shape of the linear motion transducers 105, 106.

The tilting of the lens holder 103 for vibration compensation control is realised with a degree of freedom according to the number and the placement of the linear motion transducers 105, 106 around the lens holder 103. With more then three transducers placed around the lens holder 103 with substantially equal distance between the transducers, the tilting of the lens holder 103 with two degrees of freedom is realised. The configuration of the lens actuator 100 with transducers distributed evenly around the perimeter of the lens holder 103, as shown in FIG. 2, has an advantage that the lens actuator 100 can be compactly disposed inside a square or rectangular housing 101, 107 of the lens actuator 100. By evenly distributing the transducers around the perimeter of the lens holder 103, a smoother and more accurate control of the lens holder movement can be realised.

The inside of the housing 101, 107 and the lens holder 103 desirably have relationship in size, shape, materials, etc. to allow smooth and accurate movement of the lens holder 103 inside the housing 101, 107. The protruding sections of the lens holder 103 may have depressions or protrusions for the top ends of the linear motion transducers 105, 106 to fit against. The lens holder 103 may have different configurations without departing from the scope and spirit of the invention. The housing may be in a form other than as shown in FIG. 2 as long as the housing can contain and define the movement of the lens holder 103. For example, this functionality may be realised by elements placed around the lens actuator, such as neighbouring elements residing in a cellular phone in which the lens actuator and the camera are implemented.

The linear motion transducers can be electrically connected in series depending on the kind of control that is required. For autofocus control, the coils 105 can be connected in series to allow an equal value of electricity to flow through the coils 105. For vibration compensation control, the coils 105 can be connected such that the electric current flowing through the coils 105 can be controlled independently of other coils.

The control module and the electric circuit to realise the control of the transducers 105, 106 may be a part of the lens actuator 100 or may be provided externally, for example, as a part of the main body of the camera.

By causing the linear motion transducers to be given substantially the same amount of displacement plus a differential amount of displacement, autofocus control and vibration compensation control can be realised in combination.

The lens actuator 100 can be used for a variety of optical image capturing apparatuses/systems such as a still camera, a video camera or a film camera, using a digital or analogue image capturing mechanism.

If the lens actuator 100 is used in a relatively small camera such as a camera module of a cellular phone, an arrangement that allows an overall linear motion of up to 0.5-1.0 mm in z direction and a tilting motion of up to approximately +/−2 degrees of the lens holder 103 and the lens can be practiced. This is only given for purposes of illustration and other values may in fact be practiced.

The above described arrangement of the actuator is able to provide both linear motion, for example for autofocus function, and tilting motion, for example for vibration compensation control, using the configuration of the multiple linear motion transducers placed around the carrier. This has an advantage of reducing the complexity and/or the size of an actuator. A lens actuator with a reduced size is especially desirable for small digital cameras or cellular phones with camera modules.

We claim:

1. An actuator for an image capture optical system which can perform both auto-focusing and anti-shake operations, comprising:
   a housing;
   a carrier configured to hold an imaging lens unit, the carrier positioned at least partially within the housing;
   at least one spring positioned between the carrier and the housing to provide restoring force to the carrier;
   a plurality of linear motion transducers positioned around the carrier such that each of the linear motion transducers is configured to be selectively energized and is capable of providing linear motion and tilting motion to the carrier;
      wherein each of the linear motion transducers comprises at least one coil and at least one magnetic element; and
   wherein one or more linear motion transducers are selectively actuated to cause tilting of the carrier relative to a longitudinal axis of the carrier for shaking compensation; and wherein all linear motion transducers are actuated to produce linear motion in an equal amount such that the carrier is moved in a linear motion along the longitudinal axis of the carrier for focusing operation.

2. The actuator according to claim 1 wherein the linear motion transducers provide the linear motion to the carrier such that auto-focusing of the imaging lens unit is performed by moving the carrier such that the distance between an image capturing mechanism and the carrier is changed.

3. The actuator according to claim 1, wherein the housing is non-metallic.

4. The actuator according to claim 1, wherein the carrier is non-metallic.

5. An image capture device incorporating the actuator of claim 1.

6. A camera module incorporating the actuator of claim 1, comprising:
   at least one imaging lens unit positioned at least partially within the carrier;
   an image capturing mechanism on which the imaging lens unit forms an image;
   a spacer positioned between the actuator and the image capturing mechanism.

7. A camera module incorporating the actuator of claim 1, further comprising:
   a controller configured to control the actuator by driving the linear motion transducers.

* * * * *